United States Patent
Zhu et al.

(10) Patent No.: US 7,940,660 B2
(45) Date of Patent: May 10, 2011

(54) METHODS, SYSTEMS, AND COMPUTER PROGRAM PRODUCTS FOR VOICE OVER IP (VOIP) TRAFFIC ENGINEERING AND PATH RESILIENCE USING MEDIA GATEWAY AND ASSOCIATED NEXT-HOP ROUTERS

(75) Inventors: Rupert Zhu, Richardson, TX (US); David Z. Lu, Dallas, TX (US); San-Qi Li, Plano, TX (US); Edward Y. Qian, Plano, TX (US)

(73) Assignee: Genband US LLC, Plano, TX (US)

( * ) Notice: Subject to any disclaimer, the term of this patent is extended or adjusted under 35 U.S.C. 154(b) by 1185 days.

(21) Appl. No.: 10/943,513

(22) Filed: Sep. 17, 2004

(65) Prior Publication Data

US 2005/0073998 A1    Apr. 7, 2005

Related U.S. Application Data (63) Continuation-in-part of application No. 10/676,233, filed on Oct. 1, 2003, now Pat. No. 7,424,025.

(60) Provisional application No. 60/526,126, filed on Dec. 1, 2003, provisional application No. 60/551,814, filed on Mar. 10, 2004.

(51) Int. Cl.
*G01R 31/08* (2006.01)
(52) U.S. Cl. ............... 370/230.1; 370/238; 370/401; 370/463
(58) Field of Classification Search .......... None
See application file for complete search history.

(56) References Cited

U.S. PATENT DOCUMENTS

| | | | |
|---|---|---|---|
| 6,061,348 A | 5/2000 | Castrigno et al. | |
| 6,363,065 B1 * | 3/2002 | Thornton et al. | 370/352 |
| 6,426,944 B1 * | 7/2002 | Moore | 370/236 |
| 6,633,563 B1 | 10/2003 | Lin et al. | |
| 6,674,744 B1 * | 1/2004 | Doshi et al. | 370/352 |
| 6,714,535 B1 | 3/2004 | Herh | |

(Continued)

FOREIGN PATENT DOCUMENTS

EP    1 235 409 A2    8/2002

(Continued)

OTHER PUBLICATIONS

International Search Report and Written Opinion for International Application No. PCT/US04/31920 (Mar. 4, 2005).

(Continued)

*Primary Examiner* — Robert W Wilson
(74) *Attorney, Agent, or Firm* — Jenkins, Wilson, Taylor & Hunt, P.A.

(57) ABSTRACT

Method, systems, and computer program products for voice over IP (VoIP) traffic engineering and path resilience using media gateway and associated next-hop routers are provided. In one example, a media gateway includes multiple media processing hosts and a multiple network interfaces separate from the media processing hosts. At least one of the media processing hosts is reachable via at least two of the network interfaces. Next-hop routers associated with the network interfaces advertise reachability information regarding the media processing hosts to routers in the network. The next-hop routers also participate in network routing protocols to form multiple paths between the media gateway and a remote media gateway. Costs may be assigned to associations between the media processing hosts and the next-hop routers for traffic engineering purposes.

35 Claims, 9 Drawing Sheets

U.S. PATENT DOCUMENTS

| | | | |
|---|---|---|---|
| 6,771,673 B1 | 8/2004 | Baum et al. | |
| 6,831,895 B1 | 12/2004 | Ji et al. | |
| 6,831,898 B1 * | 12/2004 | Edsall et al. | 370/256 |
| 6,879,667 B1 | 4/2005 | Carew et al. | |
| 6,956,820 B2 * | 10/2005 | Zhu et al. | 370/230.1 |
| 7,177,943 B1 | 2/2007 | Temoshenko et al. | |
| 7,185,094 B2 | 2/2007 | Marquette et al. | |
| 7,212,519 B2 | 5/2007 | Johnson et | |
| 7,394,818 B1 * | 7/2008 | Johnson et al. | 370/401 |
| 7,424,025 B2 * | 9/2008 | Qian et al. | 370/409 |
| 7,570,594 B2 | 8/2009 | Zhu et al. | |
| 7,715,403 B2 | 5/2010 | Qian et al. | |
| 2001/0036173 A1 | 11/2001 | Shmulevich et al. | |
| 2002/0006112 A1 | 1/2002 | Jaber et al. | |
| 2002/0012352 A1 | 1/2002 | Hansson et al. | |
| 2002/0016926 A1 | 2/2002 | Nguyen et al. | |
| 2002/0051464 A1 | 5/2002 | Sin et al. | |
| 2002/0172221 A1 | 11/2002 | Dale et al. | |
| 2002/0176374 A1 | 11/2002 | Lee et al. | |
| 2002/0191612 A1 | 12/2002 | Curtis | |
| 2003/0093555 A1 | 5/2003 | Harding-Jones et al. | |
| 2003/0099192 A1 * | 5/2003 | Scott et al. | 370/229 |
| 2003/0118039 A1 | 6/2003 | Nishi et al. | |
| 2003/0142795 A1 | 7/2003 | Gavette et al. | |
| 2003/0193898 A1 | 10/2003 | Wong et al. | |
| 2004/0047345 A1 | 3/2004 | Joseph et al. | |
| 2004/0066782 A1 | 4/2004 | Nassar | |
| 2005/0068942 A1 * | 3/2005 | Chu et al. | 370/352 |
| 2007/0053300 A1 | 3/2007 | Zhu et al. | |
| 2007/0064613 A1 | 3/2007 | Qian et al. | |
| 2007/0083528 A1 | 4/2007 | Matthews et al. | |

FOREIGN PATENT DOCUMENTS

| | | |
|---|---|---|
| GB | 2 363 549 A | 12/2001 |
| WO | WO 01/43387 A | 6/2001 |
| WO | WO 2004/002173 A1 | 12/2003 |
| WO | WO 2004/071036 A1 | 8/2004 |

OTHER PUBLICATIONS

International Search Report and Written Opinion for International Application No. PCT/US04/31918 (Feb. 11, 2005).

Yoo et al., "A Media Stream Processing of VoIP Media Gateway," IEEE, pp. 91-94 (2003).

Restriction Requirement for U.S. Appl. No. 11/594,568 (Nov. 26, 2008).

Notice of Allowance and Fee(s) Due for U.S. Appl. No. 11/545,788 (Nov. 5, 2008).

Interview Summary for U.S. Appl. No. 11/545,788 (Sep. 15, 2008).

Official Action for U.S. Appl. No. 10/943,513 (Aug. 11, 2008).

Notification of Transmittal of the International Search Report and the Written Opinion of the International Searching Authority, or the Declaration for International Application No. PCT/US04/32232 (Jun. 2, 2008).

Notice of Allowance and Fee(s) Due for U.S. Appl. No. 10/676,233 (May 2, 2008).

Official Action for U.S. Appl. No. 11/545,788 (Mar. 11, 2008).

Official Action for U.S. Appl. No. 10/676,233 (Nov. 28, 2007).

Official Action for U.S. Appl. No. 10/943,513 (Nov. 26, 2007).

Official Action for U.S. Appl. No. 11/545,788 (Nov. 14, 2007).

Interview Summary for U.S. Appl. No. 10/676,233 (Aug. 22, 2007).

Official Action for U.S. Appl. No. 10/676,233 (Jun. 11, 2007).

Official Action for U.S. Appl. No. 11/545,788 (May 14, 2007).

Notification of European Publication Number and Information on the Application of Article 67(3) EPC for European Application No. 04789215.3 (May 24, 2006).

Notification of European Publication Number and Information on the Application of Aritcle 67(3) EPC for European Application No. 04789383.9 (May 17, 2006).

Notification of European Publication Number and Information on the Application of Article 67(3) EPC for European Application No. 04789213.8 (May 17, 2006).

Supplemental Notice of Allowability for U.S. Appl. No. 10/943,275 (Sep. 9, 2005).

Notice of Allowance and Fee(s) Due for U.S. Appl. No. 10/943,275 (Feb. 11, 2005).

Notice of Allowance and Fee(s) Due for U.S. Appl. No. 11/594,568 (Dec. 22, 2009).

Supplementary European Search Report for European application No. 04789215.3 (Dec. 8, 2009).

Katz et al., "Traffic Engineering (TE) Extensions to OSPF Version 2," IETF RFC 3630, Network Working Group (Sep. 2003).

Moy, "OSPF Version 2," IETF RFC 2328, Network Working Group (Apr. 1998).

Supplemental European Search Report for European application No. 04789213.8 (Jul. 20, 2010).

Supplemental European Search Report for European application No. 04789383.9 (Jul. 14, 2010).

Commonly-assigned, co-pending U.S. Divisional Patent Application Serial No. "Methods, Systems, and Computer Program Products for Load Balanced and Symmetric Path Computations for VoIP Traffic Engineering," (Unpublished, filed May 5, 2010).

"Gateway Control Protocol: Shared Risk Group Package," ITU-T H.248.22, pp. 1-14 (Jul. 2003).

Venkatachalam et al., "A Highly Flexible, Distributed Multiprocessor Architecture for Network Processing," Computer Networks, vol. 41, No. 5, pp. 563-586 (Apr. 5, 2003).

Dagiuklas et al., "Architecture and Design of an Enhanced H.323 VoIP Gateway," Proceedings of IEEE International Conference on Communications. vol. 2, pp. 1209-1213 (Apr. 28, 2002).

* cited by examiner

METHODS, SYSTEMS, AND COMPUTER PROGRAM PRODUCTS FOR VOICE OVER IP (VOIP) TRAFFIC ENGINEERING AND PATH RESILIENCE USING MEDIA GATEWAY AND ASSOCIATED NEXT-HOP ROUTERS

RELATED APPLICATIONS

This application is a continuation-in-part of U.S. patent application Ser. No. 10/676,233, filed Oct. 1, 2003 now U.S. Pat. No. 7,424,025 and further claims the benefit of U.S. Provisional Patent Application Ser. No. 60/526,126, filed Dec. 1, 2003, and U.S. Provisional Patent Application Ser. No. 60/551,814, filed Mar. 10, 2004; the disclosures of which are incorporated herein by reference in their entirety.

The disclosure of the following the U.S. patent application entitled "Methods, Systems, and Computer Program Products for Voice Over IP (VoIP) Traffic Engineering and Path Resilience Using Network-Aware Media Gateway", commonly owned and simultaneously filed herewith, is incorporated by reference herein in its entirety.

TECHNICAL FIELD

The present invention relates to methods, systems, and computer program products for providing voice over IP traffic engineering and path resilience. More particularly, the present invention relates to methods, systems, and computer program products for providing VoIP traffic engineering and path resilience using a media gateway and associated next-hop routers.

RELATED ART

Recently in modern telephony, voice service providers and carriers have been transitioning from the traditional Time Division Multiplexing (TDM) network infrastructures to IP-based packet networks. Utilizing IP-based networks, voice traffic can be converted into packets and carried over IP networks. Although an IP network can be utilized to carry voice traffic, voice and data have very different characteristics. Thus, traditional TDM networks, which were designed for voice traffic, differ significantly from IP networks in terms of their capabilities, working mechanisms, and operation.

In a TDM network, voice traffic is directed from node to node based on statically provisioned routing tables. Routing is applied on a per call basis. Once the route for a call is selected, it is typically not changed for the duration of the call. Different calls from the same source to the same destination can be distributed over multiple different paths based on a set of provisioned policy rules, such as traffic loading of the links, time-of-day, and costs. The capability of distributing traffic among multiple paths is referred to as traffic engineering. In TDM networks, traffic is symmetric in both directions, its patterns are predictable, and voice quality is ensured. TDM networks are typically reliable because redundant protection and fail-over mechanisms are integral parts of the structure. Any failure triggers alarms and events for easy tracing to the root cause, and appropriate actions, such as voice call rerouting, can be taken to minimize service disruption.

Some of the important features of TDM networks include traffic engineering and load balancing. TDM networks can allocate calls over a set of eligible trunk groups based on preference, cost, policy, or dynamic performance monitoring. For example, some telephony providers may have a predetermined bandwidth price schedule based on time-of-day and day-of-week. To minimize cost, a telephony switch manager can pre-program its trunk selection algorithm accordingly, so that new calls are allocated over the trunk group incur the lowest cost during that time period. The price of bandwidth may also change more dynamically. In such instances, it is important for telephony switch managers to be able to quickly adjust the trunk group selection algorithm.

Another important feature of TDM networks includes physical layer redundancy mechanisms, such as facility protection and Synchronous Optical Network (SONET) line and ring protection. When a network failure occurs, the affected traffic can be automatically switched over to an alternative physical path in TDM networks. This fail-over is transparent to the telephony layer.

TDM networks also include a full set of failure notification functions. If a non-recoverable network failure occurs, a notification, such as an Alarm Indication Signal (AIS) or Remote Defect Indication (RDI), can be sent along a transmission path to the telephone switch. The switch can alarm a network operator and take suitable actions on affected calls. This feature of TDM networks can provide a TDM network operator with knowledge about call status and quality.

Traffic engineering, fail-over, network surveillance, and reporting are very important features in TDM networks for assuring optimum bandwidth utilization, Quality of Service (QoS), cost reduction, and traffic resilience. IP telephony has not been fully developed to provide many of these features. Therefore, it is desirable to include these features in IP networks and, in particular, Voice over IP (VoIP) deployment.

Some of the lack of features in IP telephony and VoIP deployment can be traced to the implementation of media gateways (MGs) and media gateway controllers (MGCs). Media gateways are typically used for media stream switching and, in particular, voice traffic switching. Media stream switching includes switching media packets between input and output ports and converting the media packets into the appropriate formats for the sending and receiving parties. Call control, which includes setting up and tearing down calls and maintaining call state machines, is performed by a media gateway controller. Media gateway controllers communicate call control information to media gateways via a media gateway control protocol. Typical media gateway control protocols, such as MGCP and MEGACO, include commands for communicating information about each endpoint of a session to the media gateway and instructing the media gateway as to how to process packets to be delivered to each endpoint.

Figure 1:
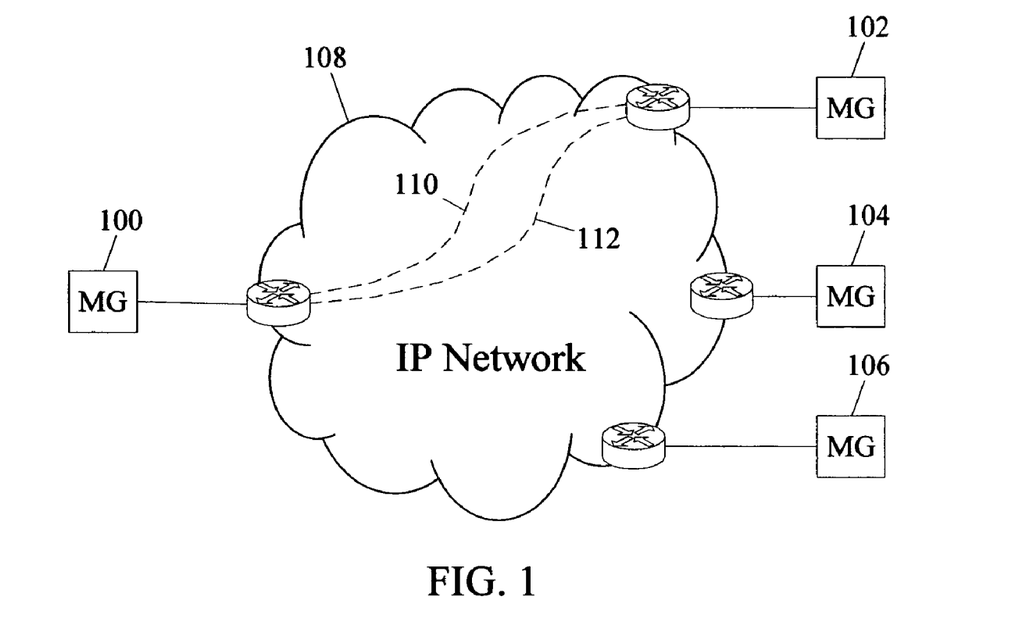
FIG. 1 is a network diagram illustrating a conventional voice over IP network with a single-interface media gateway and no path resilience.

FIG. 1 is a schematic diagram illustrating a plurality of media gateways 100, 102, 104, and 106 interconnected through an IP network 108. In this example, each media gateway 100, 102, 104, and 106 is connected to IP network 108 through one network interface. Calls can be set up between media gateways 100, 102, 104, and 106. For example, a call between media gateways 100 and 102 can follow path 110. When the capacity of path 110 is exceeded, calls will be rejected. This is because traffic is forwarded on a per packet basis with a destination-based routing scheme, where each node determines outgoing traffic based on the IP destination address. Calls can be rejected due to insufficient bandwidth resources on path 110, even though another path, such as path 112, is available to carry traffic between media gateways 100 and 102. Thus, the IP forwarding scheme used by conventional media gateways can result in a low utilization of network resources. Further, if a network event occurs that makes media gateway 102 unreachable from media gateway 100, media gateway 100 is not informed and may continue to transmit voice traffic to media gateway 102. This is because conventional media gateways only act as IP hosts without knowledge of the current network status. Summarily, media gateway 100 serves as an IP host and has neither traffic engineering support. Although carriers are trying to handle these issues by employing more sophisticated technologies, such as Multi Protocol Label Switching (MPLS), on top of IP networks, these technologies can further complicate the network system in terms of networks operations and maintenance.

Figure 2:
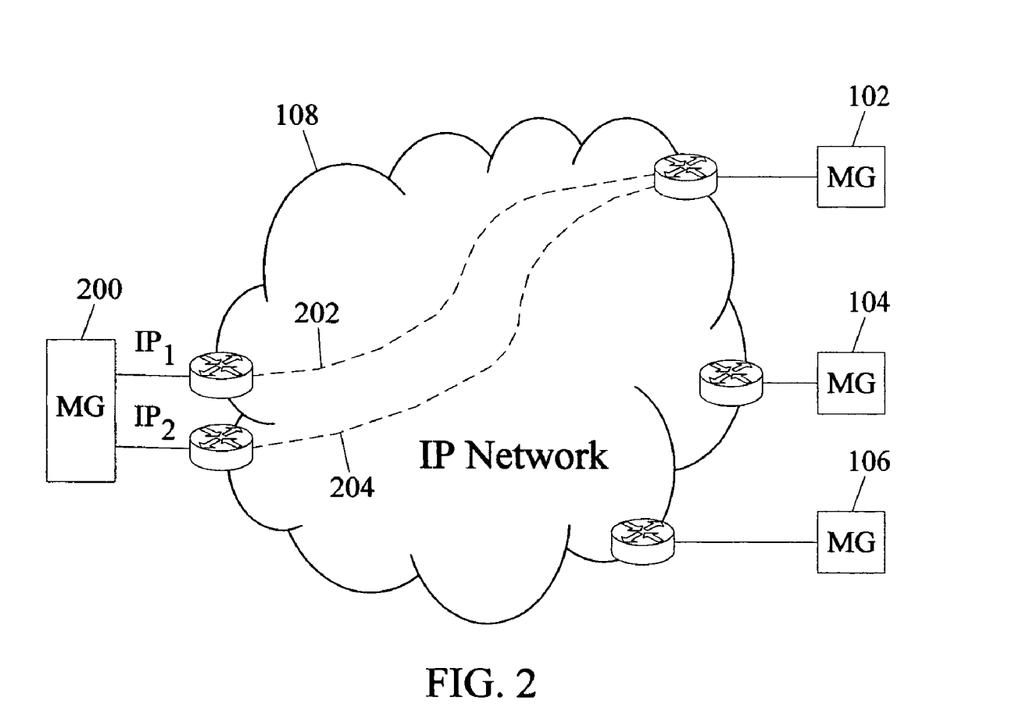
FIG. 2 is a network diagram illustrating a conventional voice over IP network with a dual-interface media gateway and no path resilience.

FIG. 2 is a schematic diagram illustrating a plurality of media gateways interconnected through an IP network 108. In this example, media gateway 200 includes a plurality of interfaces and communicates with single-interface media gateway 102 via paths 202 and 204. Media gateway 200 may behave as a multi-homing IP host with different IP addresses associated with each of its interfaces $IP_1$ and $IP_2$. If calls between media gateways 200 and 102 are distributed on paths 202 and 204, calls allocated on path 202 carry a local IP address $IP_1$, while calls allocated on path 204 carry local IP address $IP_2$. If path 202 becomes unreachable, media gateway 200 is not capable of re-allocating existing calls from path 202 to path 204 because the local IP addresses are different on the two paths. Thus, network resilience is not achieved.

Accordingly, in light of the difficulties associated with IP telephony and, in particular, with media gateways, there exists a need for improved IP telephony systems, media gateways, and related processes.

DISCLOSURE OF THE INVENTION

According to one aspect, the present invention includes methods and systems for voice over IP (VoIP) traffic engineering and path resilience using media gateway and associated next-hop routers. According to one example, a method is provided for providing a media gateway having multi-appearing media processing hosts. The method can include providing a plurality of media processing hosts containing media processing resources for processing media streams associated with media sessions between media gateways. A plurality of network interfaces and a plurality of next-hop routers may be provided to connect the media processing hosts to the network.

Each media processing host may be reachable through at least two of the interfaces. The next-hop router associated with each interface may advertise reachability and cost information for each media processing host reachable through its interface. Such multi-reachability allows remote media gateways to establish multiple paths, such as primary and backup paths, to each media gateway. In addition, each next-hop router may participate in network routing protocols to automatically update voice over IP paths in response to changing network conditions.

In addition to using network awareness provided by next hop routers, a media gateway may be partially network aware by monitoring interfaces on which media communications session packets are received. If packets associated with an existing media communications session associated with one interface of the media gateway are received on a new interface, the media gateway may forward outgoing packets associated with the session over the new interface. Such partial network awareness on the part of the media gateway allows in-progress sessions to dynamically adapt to changing network conditions.

Accordingly, it is an object of the invention to provide a media gateway and associated next-hop routers that provide end-to-end media session path resilience.

It is another object of the invention to provide a multi-appearance media gateway that allows media processing hosts to be reached via multiple interfaces and that uses per-interface next-hop routers to advertise this reachability information to routers in the network.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Exemplary embodiments of the present invention will now be explained with reference to the accompanying drawings, of which.

DETAILED DESCRIPTION OF THE INVENTION

Figure 3:
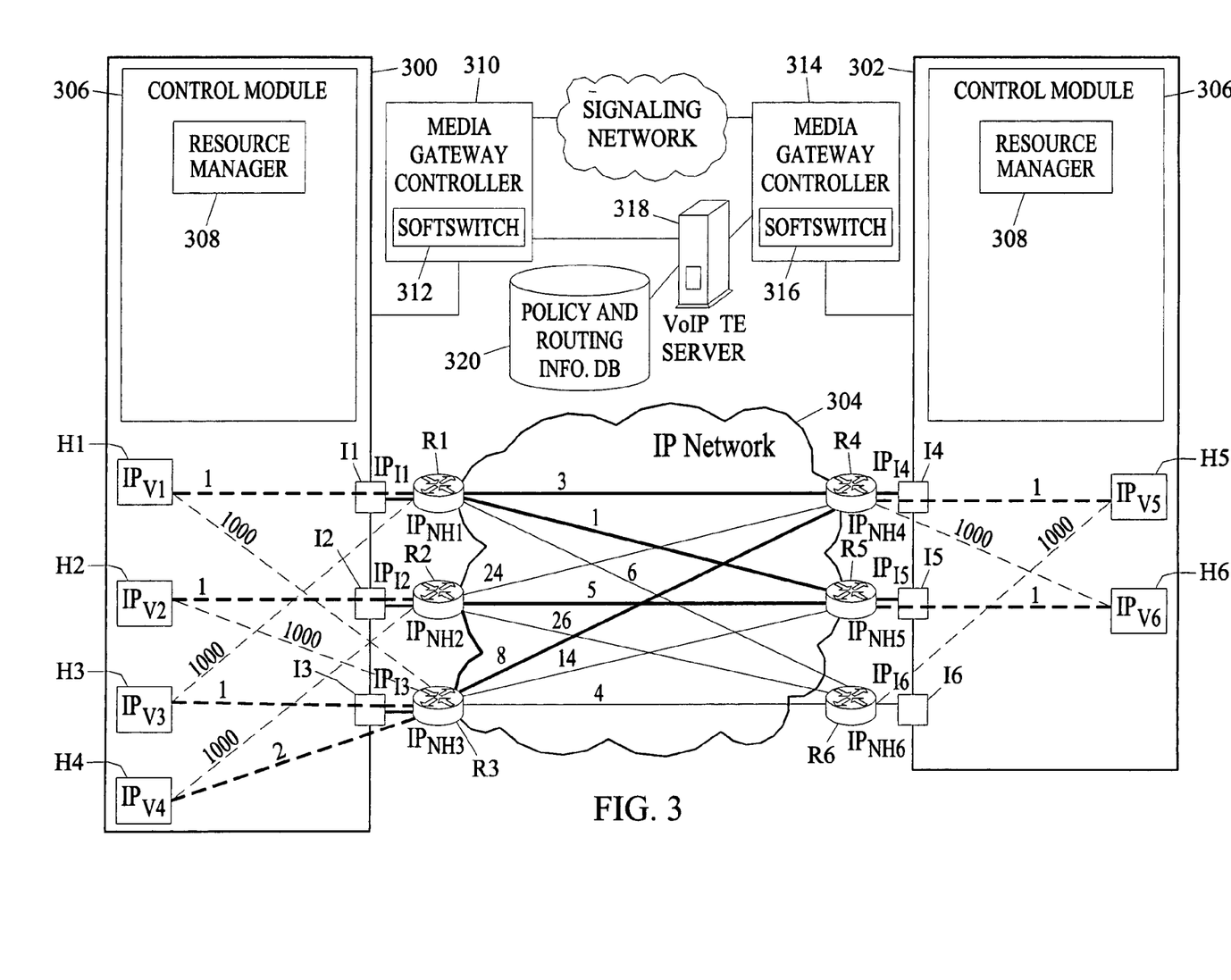
FIG. 3 is a block diagram illustrating a voice over IP network including media gateways and network aware next hop routers according to an embodiment of the present invention.

Methods, systems, and computer programs products are disclosed herein for providing VoIP traffic engineering and path resilience using a media gateway and associated next-hop routers. FIG. 3 is a schematic diagram illustrating exemplary media gateways 300 and 302 according to an embodiment of the present invention. Referring to FIG. 3, media gateways 300 and 302 are connected to one another via multiple voice over IP paths in an IP network 304. IP network 304 includes next-hop routers R1, R2, R3, R4, R5, and R6 connected via an IP network 304 and with media gateways 300 and 302. Next-hop routers R1-R3 are connected remotely, in general, to next-hop routers R4-R6 via multiple voice over IP paths with costs assigned by the network.

In the illustrated example, media gateway 300 includes voice over IP hosts H1-H4, a plurality of network interfaces I1-I3, a control module 306, and a resource manager 308. Media gateway 302 likewise includes interfaces I4-I6, voice over IP hosts H5 and H6, a control module 306, and a resource manager 308 within the control module 306. In FIG. 3, the components of media gateway 302 are assumed to be similar in function to the corresponding components of media gateway 300. Hence, for simplicity of illustration, a description of the components and operation of media gateway 302 will not be provided herein. Media gateway 300 is connected to next-hop routers R1-R3 via interfaces I1-I3, respectively. Similarly, media gateway 302 is connected to next-hop routers R4-R6 via interfaces I4-I6, respectively.

As used herein, the terms "voice server" and "voice over IP host" are used interchangeably. Each voice server or voice over IP host H1-H4 contains voice processing resources for processing voice over IP and TDM voice streams. For example, each voice over IP host may include codecs, voice over IP, ATM, and TDM chips, and digital signal processing resources for processing voice over IP streams. A detailed description of exemplary resources that may be found in voice over IP hosts H1-H4 are described in commonly assigned, co-pending U.S. patent application Ser. No. 10/676,233, the disclosure of which is incorporated herein by reference in its entirety.

According to an important aspect of the invention, voice over IP hosts H1-H4 are each assigned individual IP addresses $IP_{V1}$-$IP_{V4}$. These individual IP addresses are each reachable through multiple IP interfaces I1, I2, and I3 and associated next-hop routers R1-R3. The internal link cost from each voice over IP host to each next hop router from which the voice over IP host is reachable may be statically provisioned in the next hop router. In order to make nodes in the network aware of the multi-reachability over the voice over IP hosts, next-hop routers R1-R3 advertise reachability information and associated costs information to each voice over IP host IP address to other routers in IP network 300. Because of the multi-interface visibility of voice over IP hosts H1-H4, routers in IP network 304 can dynamically select different paths to a particular voice over IP host if a single path fails. In addition, as will be described in detail below, traffic engineering may be implemented by assigning costs to associations between hosts H1-H4 and next-hop routers R1-R3 to engineer voice traffic over different network paths.

In addition to advertising reachability information to voice over IP hosts H1-H4, next-hop routers R1-R3 preferably also collect link state information from IP network 304 and maintain routing tables, which are used in maintaining multiple paths to voice over IP destinations. As a result of the dynamic path updating, if one path to the remote end of a voice over IP session fails, because routers R1-R3 are dynamically updated by the routing protocols, the voice over IP traffic can follow an alternate path to the destination.

A media gateway may have a maximum of j paths to a remote voice over IP address, where j is determined by the number of local voice over IP addresses and the number of next hop routers. For the egress direction, the path over which packets associated with the media session will be initially forwarded may depend on the path over which packets associated with the session are received. For example, if packets associated with a session arrive on one interface, media gateway 300 may assign the session to that interface. If packets associated with the media session arrive on a new interface, media gateway 300 may dynamically assign the session to the new interface, if interface switching for existing sessions is permitted.

Media gateway 300 may make an initial choice for a session for which no packets have been received based on any suitable criteria. For example, media gateway 300 may make an initial choice for a session based on stored configuration information. The stored configuration information may indicate that the media gateway is to select outbound interfaces for a session in order to load share new sessions across the outbound interfaces. If the media gateway's initial choice for a session fails, media gateway 300 may select a new path for the session. The failure of a trial session assignment may be detected by the absence of packets from the remote end of a session within a predetermined time period.

Control module 306 of media gateway 300 controls the overall operation of media gateway 300 and communicates with media gateway controller 312 to set up and tear down calls. Resource manager 308 of control module 306 allocates new voice over IP sessions to incoming calls. Resource manager 308 may assign a voice over IP session to one of the hosts H1-H4. Resource manager 308 uses hosts H1-H4 dynamically. Resource manager 308 may then populate voice over IP session tables that specify outgoing interfaces.

Media gateway controller 310 may include an internal softswitch 312 for controlling the operations of media gateway 300. Similarly, media gateway controller 314 may include an internal softswitch 316 for setting up and tearing down sessions in media gateway 302. As discussed above, communications between media gateways and their associated media gateway controllers may occur via a standard media gateway control protocol, such as MGCP or MEGACO. A centralized voice over IP traffic engineering server 318 may perform traffic engineering functions based on policy and routing information stored in policy and routing information database 320. Exemplary traffic engineering functions that may be provided by voice over IP traffic engineering server 318 will be described in detail below.

Figure 4:
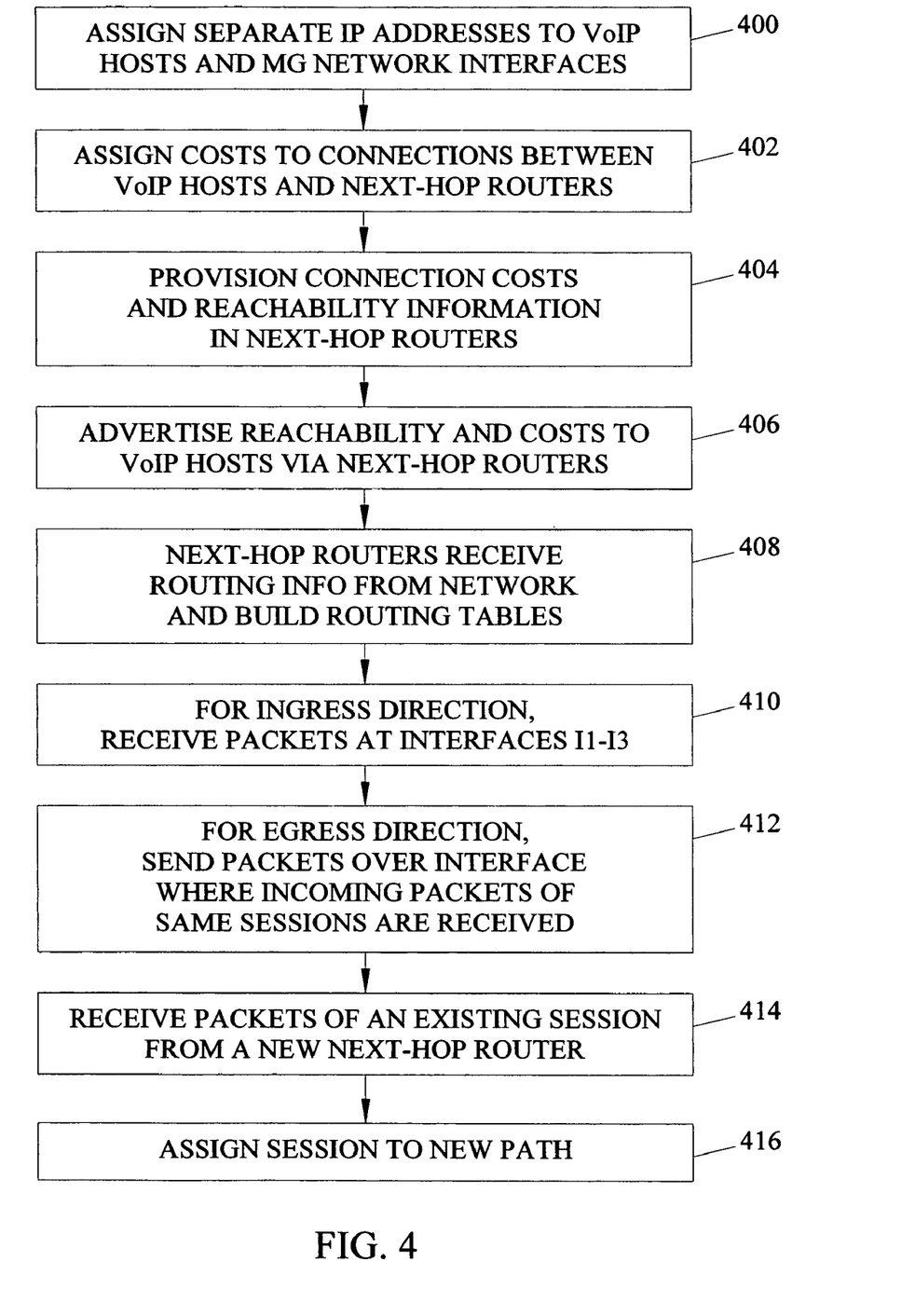
FIG. 4 is a flow chart that illustrates exemplary steps for providing VoIP traffic engineering and path resilience using a multi-appearance media gateway and network-aware next-hop routers according to an embodiment of the present invention.

FIG. 4 is a flow chart illustrating exemplary overall steps for providing VoIP traffic engineering and path resilience using a media gateway according to an embodiment of the present invention. Referring to FIG. 4, in step 400 a media gateway operator assigns separate IP addresses to voice over IP hosts and network interfaces in the media gateway. In step 402, the media gateway operator assigns costs to connections between the voice over IP hosts H1-H4 and the associated next-hop routers R1-R3 associated with each network interface I1-I3. The costs may be assigned for traffic engineering purposes, such as load sharing, or for providing path redundancy.

In step 404, connection costs and reachability information are provisioned in next-hop routers R1-R3. Next, in step 406, next-hop routers R1-R3 advertise reachability and connection costs to voice over IP hosts to IP network 304. Using Open Shortest Path First (OSPF) as example, this step may be performed by sending OSPF link state messages to network routers in IP network 304. The costs associated with connecting to voice over IP hosts may be set by the media gateway operator to be compatible with the costs assigned by routers in the network to external connections so that network routers can include the connection costs from the next-hop routers to the voice over IP hosts in their route cost computations. In one implementation, the connection costs from the next-hop routers to the voice over IP hosts can be set to be equal to network route costs so that changes in the connection costs will have the same effect on end-to-end routes as changes in external route costs. In an alternate implementation, the connection costs may be set much greater than network route costs, i.e., at least one order of magnitude greater than network route costs, so that internal costs will have no effect on influencing routing in the network. In yet another alternate implementation, the connection costs may be set much less than, i.e., at least one order of magnitude less than, network route costs so that changes in the network will affect routing preference determined by the assigned costs.

In step 408, the next-hop routers receive routing information from the network and build routing tables. Building routing tables in the next-hop routers enables the next-hop routers to dynamically respond to changing conditions in the network.

In step 410, for the ingress direction towards media gateway 300, packets are received at interfaces I1-I3 according to routes defined in next-hop routers R1-R3. The routes followed by the packets may be dynamically altered when a network error occurs in one of the routes defined in the routing tables.

In step 412, packets leaving media gateway 300 are sent over the interface corresponding to the next-hop router where incoming packets of the same session are received. According to one embodiment, the next-hop router's MAC address may be determined by extracting the source MAC address of incoming packets of the same session. The outgoing path is thus determined by "passively listening" and then following the incoming path of the same VoIP session.

In step 414, if one path in a network fails or experiences a change in cost relative to other paths, packets may arrive on a different next-hop router. If this occurs, media gateway 300 may be configurable by the operator to allow packets from an existing session on a new next-hop router or not to allow next-hop router switching. One reason to allow next-hop router switching is to provide end-to-end redundancy. One reason that it may not be desirable to allow next-hop router switching is to individually control bandwidth allocated to each next-hop router. If next-hop router switching is allowed, control proceeds to step 416 where the session is assigned to a new path.

According to one embodiment, the media gateway includes a hold timer defining a period of time that the media gateway waits before switching to a new next-hop router if packets for the same VoIP session begin arriving at a new next-hop router. The hold timer and the associated operation of switching a session to a new next-hop router is described in more detail below. Thus, using the steps illustrated in FIG. 4, network-wide path resilience and traffic engineering can be achieved using a media gateway and its next-hop routers.

Participation in Network Routing Protocols and Path Cost Computation

As stated above, based on costs assigned to each next-hop router and costs associated with all available VoIP paths to media gateway 302, next-hop routers R1-R3 may compute total costs for delivering VoIP traffic from themselves to IP hosts H5-H6. The total cost preferably includes the cost of the path in the network between the next routers NH1-NH3 and NH4-NH6 as well as any costs from NH4-NH6 to media gateway 302. The total cost preferably does not include costs between NH1-NH3 and media gateway 300, since these costs are upstream from the next-hop routers. Next-hop routers R1-R3 can determine the costs of the paths to media gateway 302 utilizing costs received via a routing protocol, such as the OSPF routing protocol. Next-hop routers R1-R3 can participate in routing information exchange with IP network 304 and appear as a router to IP network 304. Each next-hop router R1-R3 may receive and process routing updates and determines reachability and routing costs to remote IP addresses independently.

Each next-hop router R1-R3 may include an OSPF protocol stack for OSPF link state advertisement message exchange and OSPF computation. The protocol stack may maintain a link state database based on received OSPF messages from adjacent routers in IP network 304. The link state database may include information regarding network topology and link metrics. From this network topology and link metric information, each next-hop router R1-R3 generates a routing table containing routes to remote voice over IP hosts with cost associated with each route. For example, as illustrated in FIG. 3, voice over IP path from next-hop router R1 to voice over IP host H5 may be assigned a total cost of 4 because the network cost is 3 and the cost from voice over IP host H5 to next-hop router R4 is 1.

The present invention is not limited to using a link state routing exchange protocol, such as OSPF. In an alternate embodiment, each next-hop router R1-R3 may implement a distance vector routing protocol, such as routing information protocol (RIP), without departing from the scope of the invention. Any suitable routing protocol that provides knowledge of current network conditions and topology may be used. By participating in network routing protocols, each next-hop router R1-R3 maintains a real time view of paths to media gateway 302 and IP network 304 dynamically adjusts routes to voice over IP hosts H1-H4.

Incoming traffic distribution through interfaces I1-I3 can be controlled by varying the assigned costs to associations between voice over IP hosts and next-hop routers. Decreasing the cost associated with one of the associations between a next-hop router and a voice over IP host increases the chance of distribution of traffic to the interface associated with the link. Conversely, increasing the cost associated with one of the associations between a next-hop router and a voice over IP host distributes traffic to the interfaces that are not associated with the link.

Costs can be assigned to links such that each VoIP host has a primary next-hop router and a number of secondary next-hop routers. The primary next-hop router is assigned a lower cost than the secondary next-hop routers. For example, referring to FIG. 3, the primary interface of VoIP host H1 is next-hop router R1 with cost 1. The secondary next-hop router of VoIP host H1 is next-hop router R3 with cost 1000. Therefore, typically, incoming traffic for each host is routed to the primary next-hop router. Traffic can be re-routed to the secondary next-hop router when network failure that makes the primary next-hop router unreachable or reachable at a higher cost than the secondary next hop router.

As stated above, the cost assigned to associations between next-hop routers R1-R3 and voice over IP host H1-H4 may be assigned by the media gateway operator and stored in a cost matrix, which is distributed across the route tables of next-hop routers R1-R3. Table 1 shown below illustrates an exemplary cost matrix that may be provisioned in next-hop routers R1-R3 shown in FIG. 3.

TABLE 1

| Link Cost Matrix for Media Gateway 300 of FIG. 3 | | | |
|---|---|---|---|
| | Next-Hop Router R1 | Next-Hop Router R2 | Next-Hop Router R3 |
| Host H1 | 1 | ∞ | 1000 |
| Host H2 | ∞ | 1 | 1000 |
| Host H3 | 1000 | ∞ | 1 |
| Host H4 | ∞ | 1000 | 2 |

In Table 1, each column represents cost data that may be provisioned in each next-hop router. For example, column 2 represents the internal link cost data that may be provisioned in next-hop router R1, column 3 represents the internal link cost data that may be provisioned in next-hop router R2, and column 4 represents the internal link cost data that may be provisioned in next-hop router R3. Each cell represents the cost of link between one of voice over IP hosts H1-H4 and one of next-hop routers R1-R3. For example, the cost between next-hop router R1 and host H1 is shown to be 1. The internal cost from next-hop router R2 to host H1 is shown as infinity, because host H1 is not reachable via next-hop router R2 in the exemplary configuration illustrated in FIG. 3. The cost of the link between next-hop router R3 and host H1 is shown to be 1000, since this link is intended to be a backup link that will only be used if next-hop router R1 fails. Thus, by appropriately provisioning values in next-hop routers R1-R3, the media gateway operator can engineer traffic over a specified link.

Figure 5:
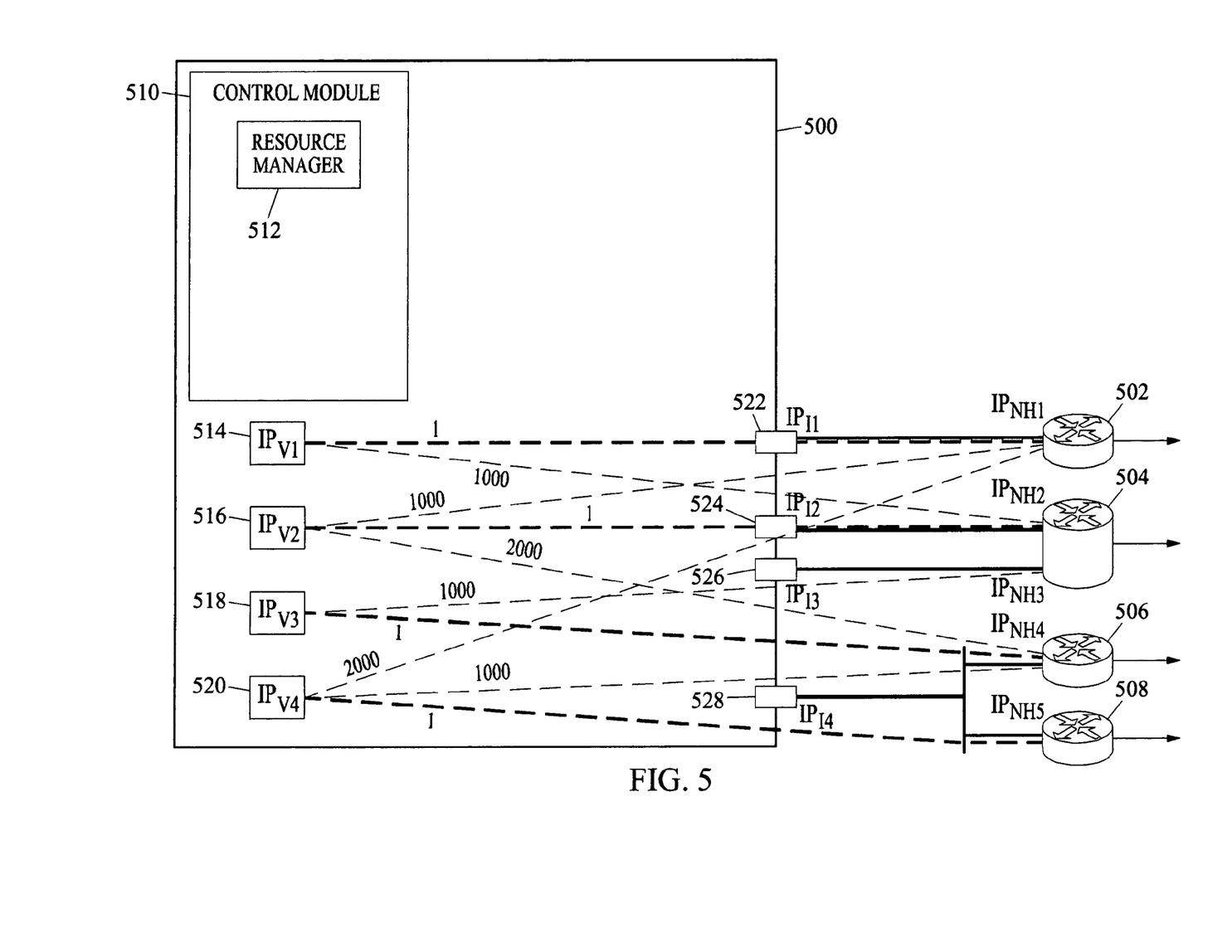
FIG. 5 is a schematic diagram illustrating an exemplary media gateway in which some next-hop routers are associated with multiple interfaces and some interfaces are associated with multiple next-hop routers according to an embodiment of the present invention.

FIG. 5 is a schematic diagram illustrating an exemplary media gateway 500 in which some interfaces have connections to multiple next-hop routers and some next-hop routers have connections to multiple interfaces according to an embodiment of the present invention. Referring to FIG. 5, media gateway 500 is connected via next-hop routers 502, 504, 506, and 508 to an IP network (not shown). Media gateway 500 includes a control module 510 and a resource manager 512.

Media gateway 500 also includes voice over IP hosts 514, 516, 518, and 520 having IP addresses $IP_{V1}$-$IP_{V4}$, respectively. These individual IP addresses are each reachable through multiple IP interfaces 522, 524, 526, and 528. Interfaces can be directly connected to next-hop routers 502, 504, 506, and 508, respectively, in a variety of ways. For example, interface 522 is connected to next-hop router 502. Interface 524 is connected to next-hop router 504. Interface 526 is connected to next-hop router 504. Interface 528 is connected to next-hop routers 506 and 508.

Next-hop routers 502, 504, 506, and 508 are provisioned with costs associated with associations between voice over IP hosts 514, 516, 518, and 520 and next-hop routers 502, 504, 506, and 508. Table 2 shown below illustrates an exemplary cost matrix for each IP address of next-hop routers 502, 504, 506, and 508 shown in FIG. 5.

TABLE 2

Link Cost Matrix for Media Gateway 500 of FIG. 5

| | $IP_{NH1}$ | $IP_{NH2}$ | $IP_{NH3}$ | $IP_{NH4}$ | $IP_{NH5}$ |
|---|---|---|---|---|---|
| Host H1 | 1 | 1000 | ∞ | ∞ | ∞ |
| Host H2 | 1000 | 1 | ∞ | 2000 | ∞ |
| Host H3 | ∞ | ∞ | 1000 | 1 | ∞ |
| Host H4 | 2000 | ∞ | ∞ | 1000 | 1 |

In Table 2, each column represents static routes provisioned for each next-hop router IP address. For example, column 2 represents internal link costs provisioned in next-hop router 502 for IP address $IP_{NH1}$, column 3 represents internal link costs provisioned in next-hop router 504 for IP address $IP_{NH2}$, column 4 represents internal link costs provisioned in next-hop outer 504 for IP address $IP_{NH3}$ in next-hop router 504. Column 5 represents internal link costs provisioned in next-hop router 506 for IP address $IP_{NH4}$, and column 6 represents internal link costs provisioned in next-hop router 508 for IP address $IP_{NH5}$. From FIG. 5 and the data illustrated in Table 2, multiple next-hop routers can be associated with the interface of a media gateway and multiple interfaces of the media gateway may be associated with the same next-hop router without departing from the scope of the invention.

Simplified Ethernet Redundancy

Figure 6:
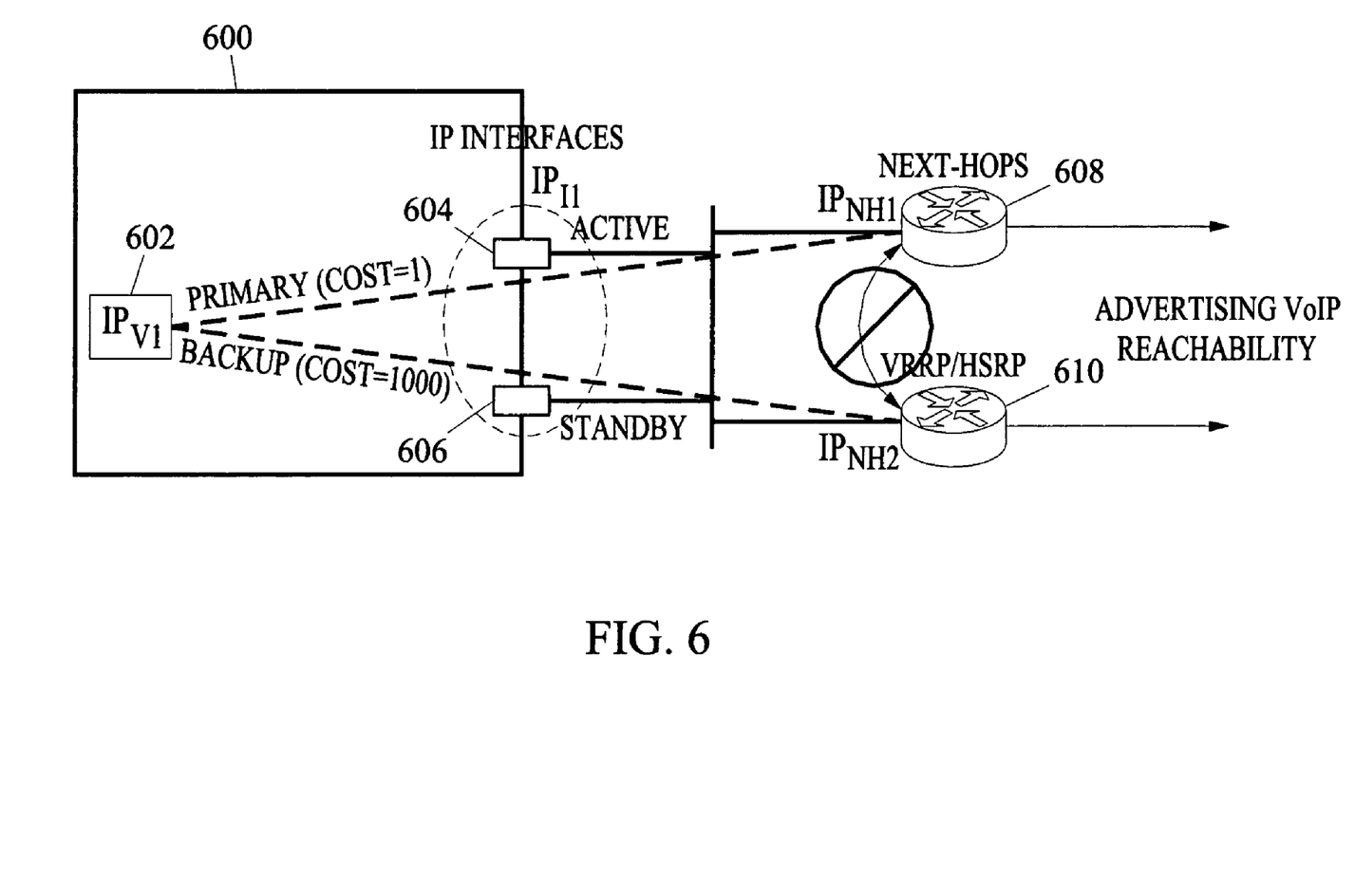
FIG. 6 is a schematic diagram illustrating an exemplary media gateway for providing network interface redundancy without requiring the next-hop routers to execute complex redundancy protocols according to an embodiment of the present invention.

In addition to providing IP path redundancy, a media gateway and an associated next-hop router of the present invention may also provide Ethernet redundancy without requiring complex Ethernet redundancy protocols, such as virtual router redundancy protocol (VRRP) or hot stand by routing protocol (HSRP), to be run on the next-hop router. FIG. 6 illustrates a media gateway with redundant Ethernet interfaces according to an embodiment of the present invention. In FIG. 6, media gateway 600 includes a voice over IP host 602 reachable through interfaces 604 and 606. Interfaces 604 and 606 both have the IP address $IP_{I1}$. Interface 604 functions as the primary interface and interface 606 functions as a hot standby interface. Interfaces 604 and 606 are redundantly connected to next-hop routers 608 and 610 via a local area network. The cost between interface 604 and voice over IP host 602 is 1 and the cost between interface 606 and voice over IP host 602 is 1000.

In FIG. 6, because routers 608 and 610 are not required to execute a redundancy protocol, both routers are active and independent. For the ingress direction, the appearance of voice over IP host 602 via multiple interfaces ensures that voice over IP host 602 is reachable by either of next-hop routers 608 and 610. In the egress direction, as described above, voice over IP traffic will follow the same next hop over which a session was received. In order to initiate a session with a remote media gateway, media gateway 600 may initially send traffic to the remote media gateway via router 608 and then via router 610. The remote media gateway will select one of the next-hop routers 608 or 610 to deliver traffic for the session to media gateway 600. After sending data for the session to the remote media gateway, media gateway 600 expects incoming traffic from the session. When incoming traffic is received, media gateway 600 will forward traffic over the same next-hop from which traffic was received. If the current next-hop router fails, traffic from the session will begin arriving via the new next-hop. Media gateway 600 will follow the traffic by sending outbound packets over the new next-hop. If the active Ethernet interface in media gateway 600 fails or if a link fails, media gateway 600 detects the failure and switches traffic to the standby card. Because the cards have the same IP address, such switching is transparent to the next-hop routers. When the standby interface becomes active, the new active interface will respond to the next ARP request from the next-hop router so that the ARP table at the next-hop router has the correct physical interface address for $IP_{I1}$. Thus, using these steps, Ethernet interface redundancy can be provided without requiring that the next-hop routers run complex redundancy protocols.

Prevention of VoIP Traffic Flapping

Voice over IP traffic flapping refers to a phenomenon that occurs when media gateways at remote ends of a session perpetually switch between paths for the session. This phenomenon may be caused when a network failure occurs causing traffic to arrive at a new interface in both media gateways of a session. Because traffic arrives at a new interface, each media gateway may select the new interface as the outbound interface for traffic. If the selection occurs simultaneously, this may cause traffic originating from each media gateway to simultaneously arrive at another new interface of the remote media gateway, causing another switch. This phenomenon may be repeated if protective steps are not taken.

Figure 7:
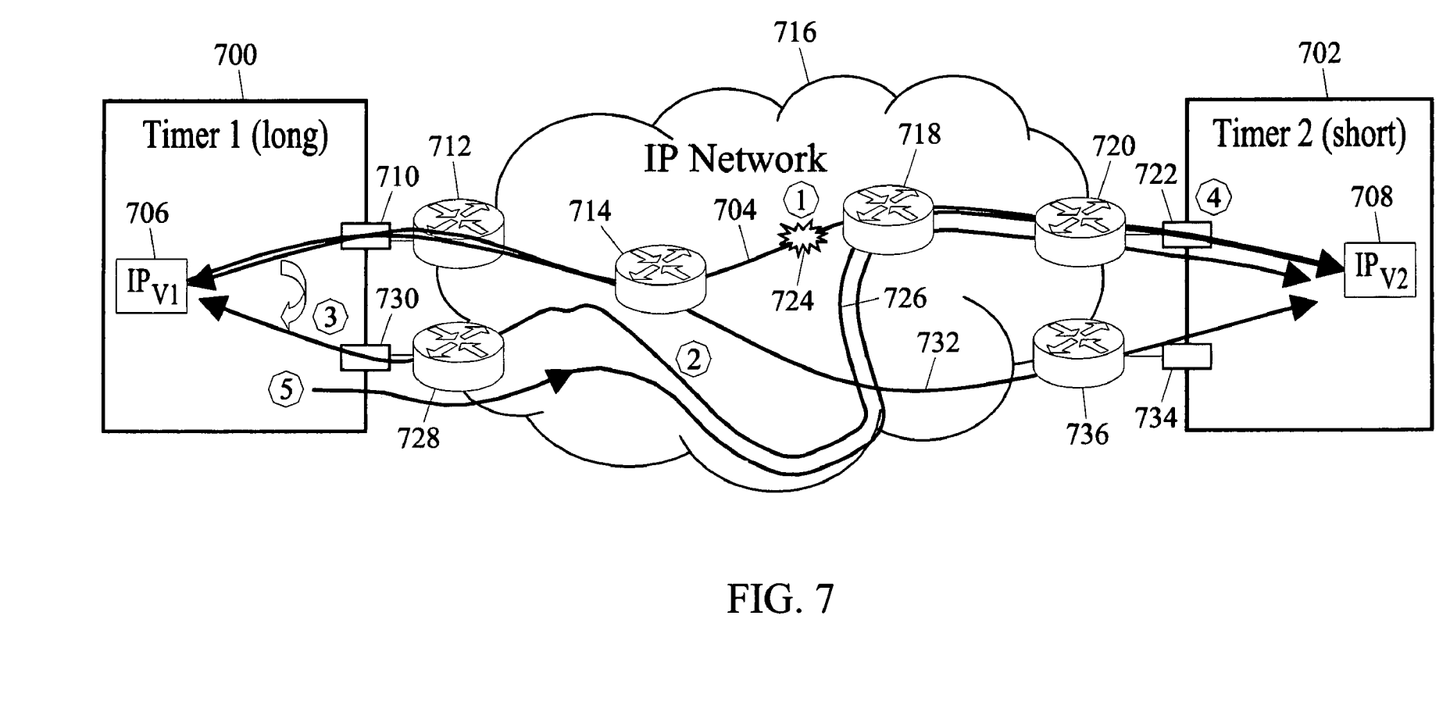
FIG. 7 is a network diagram illustrating exemplary steps for preventing VoIP traffic flapping according to an embodiment of the present invention.

FIG. 7 is a schematic diagram illustrating exemplary media gateways 700 and 702 undergoing voice over IP traffic flapping. Initially, during a particular VoIP session, VoIP traffic flows along a VoIP path 704 between voice over IP hosts 706 and 708 of media gateways 700 and 702, respectively. In this example, media gateway 702 is the calling party for the VoIP session. VoIP path 704 extends through interface 710 of media gateway 700, next-hop router 712 of media gateway 700, router 714 of IP network 716, router 718 of IP network 716, next-hop router 720 of media gateway 702, and interface 722 of media gateway 702.

When a failure occurs in VoIP path 704, for example at location 724, VoIP traffic may be rerouted. For example, when the failure occurs, packets from media gateway 702 will be re-routed over VoIP path 726, which extends through interface 722, next-hop router 720, router 718, next-hop router 728 of media gateway 700, and interface 730 of media gateway 700. In addition, packets from media gateway 700 will be re-routed over VoIP path 732, which extends through interface 734 of media gateway 702, next-hop router 736 of media gateway 702, router 714, next-hop router 712, and interface 710. Thus, media gateway 700 receives packets for the VoIP session on interface 730, and media gateway 702 receives packets for the VoIP session on interface 734.

When media gateway 700 receives packets via VoIP path 726 at interface 730, media gateway 700 transmits outgoing packets for the VoIP session on interface 730. Similarly, when media gateway 702 receives packets via VoIP path 732 at interface 734, media gateway 702 transmits outgoing packets for the VoIP session on interface 734. This switching of outbound interfaces will again cause the inbound interfaces through which packets are received to switch, which triggers a change in outbound interfaces. The switching may occur perpetually without some mechanism for preventing such switching.

In order to prevent voice over IP session flapping, different session switching hold timers are set at each media gateway. The hold timers define a time that each media gateway waits before switching outbound packets to a new session when inbound packets are received over a different interface or next-hop router. Because the hold timers at the media gateways are different, simultaneous interface switching will be avoided.

FIG. 7 illustrates how this method for preventing session flapping functions. In FIG. 7, step 1, a failure occurs on path 704. At step 2, traffic is rerouted over path 726 and arrives at media gateway 700 over a different next-hop router than previous packets associated with the session. However, rather than immediately switching to outbound packets to the new next-hop router, the timer defined at media gateway 700 causes media gateway 700 to wait for a predetermined time period before switching outbound packets associated with the session to the new next-hop router. At step 4, media gateway 702 also wait for a predetermined time before switchover, rather than switching to next-hop router 736. As a result, media gateway 700 continues to receive packets for the session over the new next-hop router 728. Since timer on 702 is much longer than 700, at step 5, media gateway 700 switches the new next-hop router, which causes packets to be routed to next-hop router 720 of media gateway 702. Traffic between the media gateways for the session will then occur via next-hop routers 720 and 728 and will not simultaneously switch to a new path. Thus, by defining different time periods in the media gateways or switching to new next-hop routers, traffic flapping is avoided. The Timer value can be as small as 0.

Traffic Engineering and Load Balancing

Figure 8:
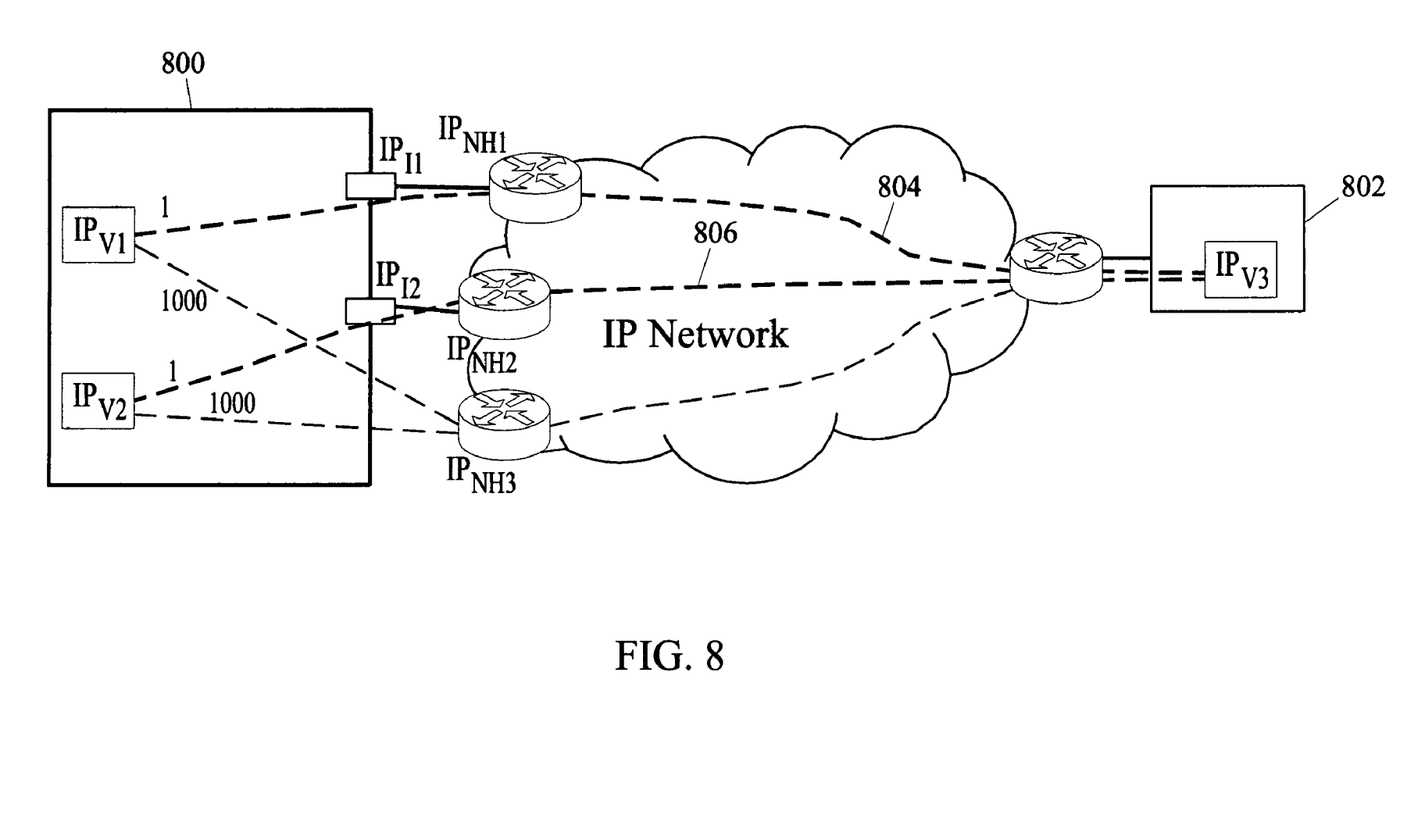
FIG. 8 is a network diagram illustrating an exemplary media gateway for providing end-to-end VoIP path redundancy according to an embodiment of the present invention.

Because media gateways according to the present invention include multiple voice over IP hosts reachable via multiple next-hop routers, sessions originating from a media gateway can be assigned any of the next-hop routers for traffic engineering or load balancing purposes. FIG. 8 illustrates an example in which sessions can be load balanced between media gateways. Referring to FIG. 8, media gateway 800 is connected to remote media gateway 802 via IP paths 804 and 806. Traffic between IP address $IP_{V1}$ in media gateway 800 and IP address $IP_{V3}$ in media gateway 802 will eventually converge to path 804, assuming that this is the lowest cost path through the network. Similarly, traffic between IP address $IP_{V2}$ and IP address $IP_{V3}$ will converge to path 806, assuming that this is the lowest cost path in the network. When media gateway 800 originates a session to media gateway 802, media gateway 800 may select either IP address $IP_{V1}$ or $IP_{V2}$. If IP address $IP_{V1}$ is selected as the local voice over IP address for the session, traffic for the session will flow over path 804 in the network. For the next session originated by media gateway 800, media gateway may assign IP address $IP_{V2}$ to the session. This will cause the traffic to be forwarded over path 806. Thus, by alternatingly selecting different local voice over IP addresses, media gateway 800 can load balance traffic across multiple paths in the IP network.

Network Resilience

Figure 9:
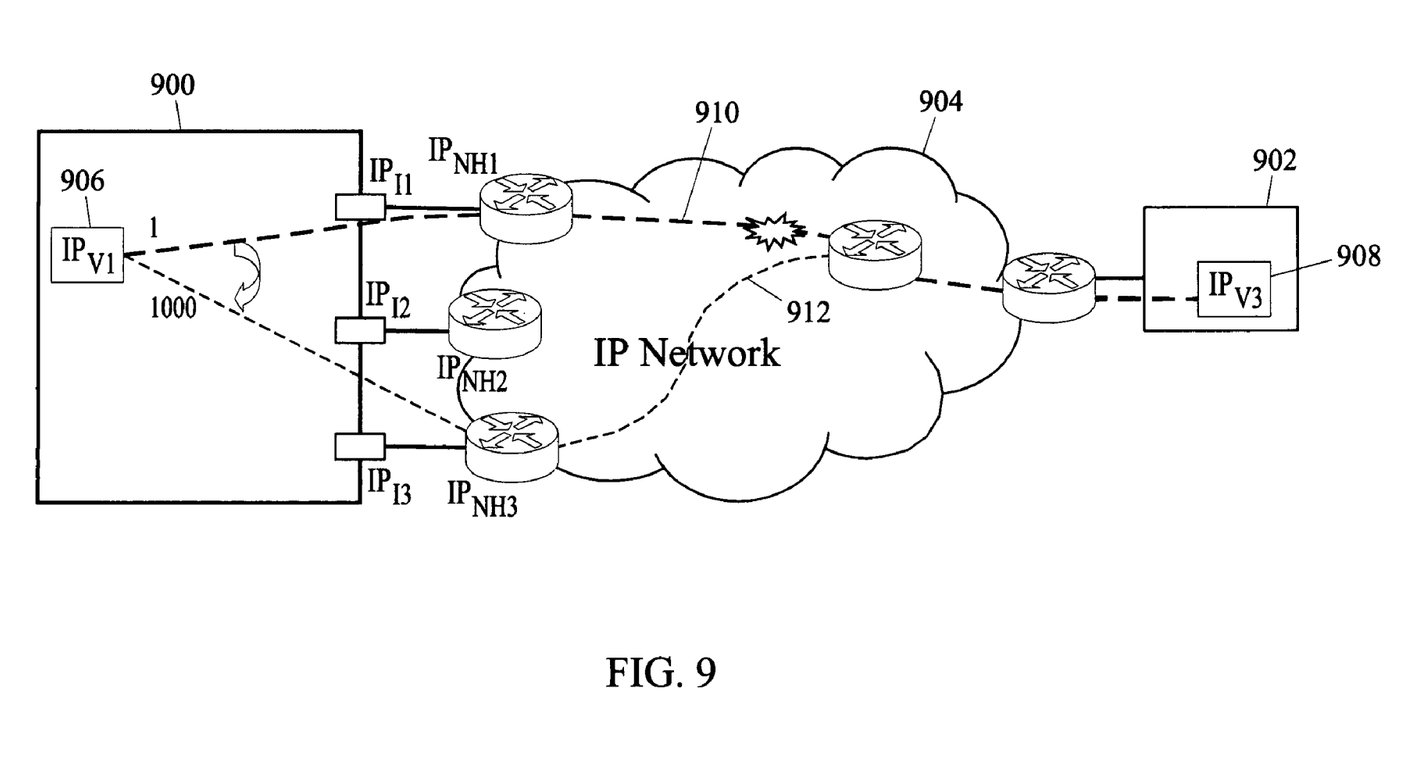
FIG. 9 is a network diagram illustrating a media gateway for providing VoIP path resilience according to an embodiment of the present invention.

As discussed above, by providing next-hop routers that participate in network routing protocols and by providing a media gateway that switches sessions to a new path after a route change and a predetermined time period, the present invention provides end-to-end network resilience. FIG. 9 is a network diagram illustrating an example of the network resilience provided by a media gateway and its associated next-hop routers according to an embodiment of the present invention. Referring to FIG. 9, media gateways 900 and 902 communicate over IP network 904. In particular, IP host 906 in media gateway 900 is assumed to have a session with IP host 908 in media gateway 902. The session initially traverses a path 910 in IP network 904. When a failure occurs on path 910, routers in the IP network switch packets associated with the session to path 912. This switching is done automatically by routing protocols, such as OSPF. When the session is switched to path 912, the next hop router at media gateway 900 changes. Media gateway 900 is preferably continuously monitoring voice over IP sessions for path changes. In this case, media gateway 900 would detect that a path change occurred. Using the example described above, after a predetermined timer expires, media gateway 900 may switch the session to the new path as indicated by the arrow in FIG. 9. No switching is required at media gateway 902 since media gateway 902 includes a single interface and a single next-hop router. Thus, using routing protocols and session switching, a media gateway and its associated next-hop routers provide end-to-end network path resilience.

Multi-Domain Support

Figure 10:
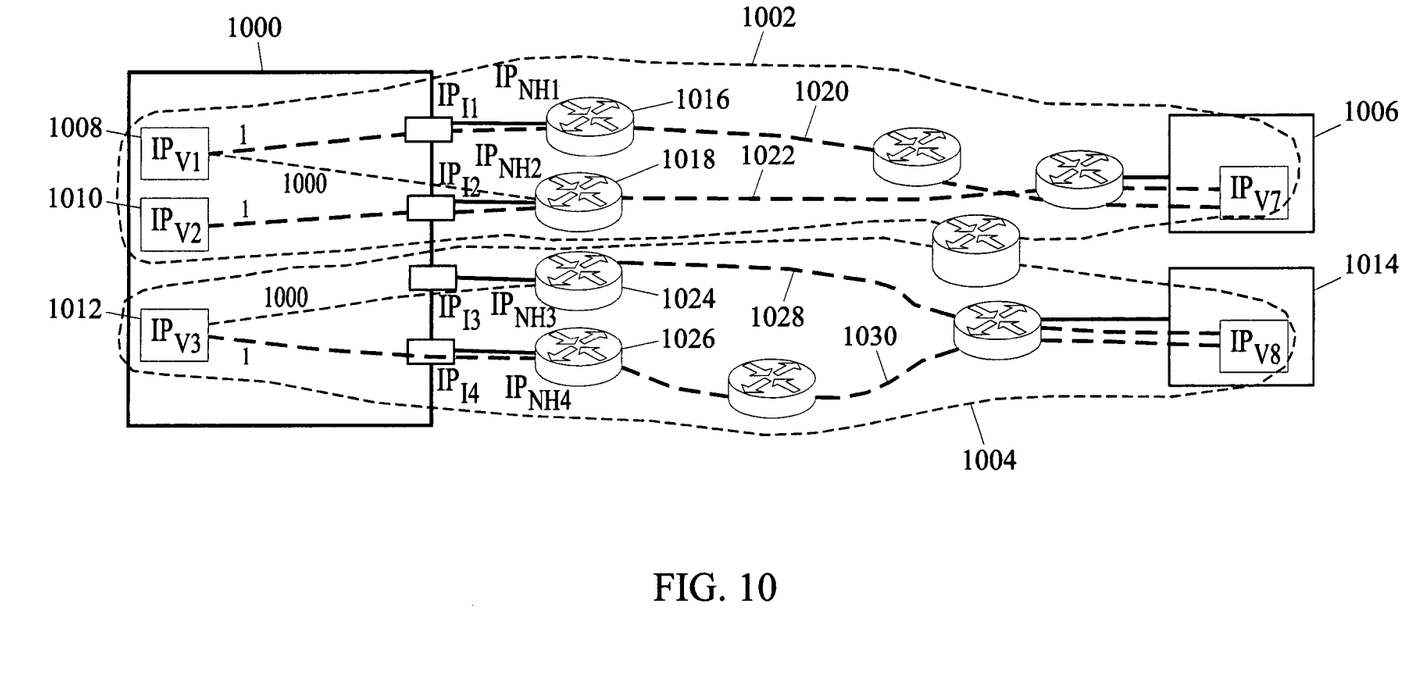
FIG. 10 is a network diagram illustrating a media gateway applied to two IP domains according to an embodiment of present invention.

A media gateway according to the present invention can also be applied to a multi-domain environment. In this embodiment, a number of VoIP addresses and next-hop routers are partitioned to fit into two or more domains (or IP address spaces). FIG. 10 is a schematic diagram illustrating a media gateway 1000 applied to two IP domains (i.e., IP networks 1002 and 1004). Media gateway 1000 is connected to media gateways 1006 and 1008, which are contained within different IP domains, i.e., IP networks 1002 and 1004, respectively.

Media gateway 1000 includes voice over IP hosts 1008, 1010, and 1012. Voice over IP hosts 1008 and 1010 are connected to media gateway 1006. Voice over IP host 1012 is connected to media gateway 1014. Voice over IP host 1008 may connect to media gateway 1006 via next-hop routers 1016 and 1018 and VoIP paths 1020 and 1022. Voice over IP host 1010 may connect to media gateway 1006 via next-hop router 1018 and VoIP path 1022. Voice over IP host 1012 may connect to media gateway 1014 via next-hop routers 1024 and 1026 and VoIP paths 1028 and 1030.

Table 3 shown below illustrates an exemplary cost matrix in next-hop routers 1016, 1018, 1024, and 1026 shown in FIG. 10.

TABLE 3

Link Cost Matrix for Media Gateway 1000 of FIG. 10

| | Next-Hop Router 1016 | Next-Hop Router 1018 | Next-Hop Router 1024 | Next-Hop Router 1026 |
|---|---|---|---|---|
| Host 1008 | 1 | 1000 | N/A | N/A |
| Host 1010 | ∞ | 1 | N/A | N/A |
| Host 1012 | N/A | N/A | 1000 | 1 |

In Table 3, there is no overlapping among the partitions of IP domains. For example, next hop router 1016 in domain 1002 is preferably not provisioned with any reachability information for voice over IP host 1012 in domain 1004. The entries in Table 3 that do not apply to a particular domain appear as blank or "N/A" entries on the diagonals. Thus, the overall cost matrix is a quasi-diagonal matrix.

The media gateway described herein addresses the problems of VoIP traffic engineering in a connectionless IP network. However, the media gateway can be applied to other suitable networks other than connectionless IP network. For example, concept of "VoIP path" described herein is applicable to media gateway VoIP traffic engineering requirements in connection-oriented or hybrid virtual circuit networks, such as MPLS, ATM, and frame relay networks. The cost matrix configuration described herein can be applied to cover the cost between a number of voice over IP hosts and any virtual circuit that carries VoIP traffic. In addition, the network awareness concepts described herein can be extended to monitor state and quality associated with all virtual circuits between media gateways.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for providing a media gateway having multi-appearing voice servers, the method comprising:
   (a) providing a plurality of voice servers within a media gateway, each voice server including media processing resources for processing media streams associated with media sessions between media gateways, wherein the media processing resources on each voice server include at least one of: a codec; voice over IP, ATM, and TDM chips; and digital signal processing resources, wherein the media gateway controls each of the voice servers, and the media gateway is controlled by a media gateway controller, wherein the media gateway controller communicates call control information to the media gateway via a media gateway control protocol;
   (b) providing a plurality of network interfaces within the media gateway, wherein at least one of the voice servers is reachable through at least two of the interfaces; and
   (c) providing a plurality of next-hop routers external to the media gateway for connecting the interfaces and the voice servers to a network.

2. The method of claim 1 comprising assigning costs to associations between each next-hop router and each voice server reachable via the next-hop routers.

3. The method of claim 2 wherein assigning costs to associations between the next-hop routers and voice servers reachable via the next-hop routers includes assigning costs that are substantially equal to network route costs to remote voice servers.

4. The method of claim 2 wherein assigning costs to associations between the next-hop routers and voice servers reachable via the next-hop routers includes assigning costs to the links that are at least one order of magnitude less than network route costs to remote voice servers.

5. The method of claim 2 wherein assigning costs to associations between the next-hop routers and voice servers reachable via the next-hop routers includes provisioning cost and reachability information regarding the voice servers in the next-hop routers.

6. The method of claim 1 comprising: receiving a plurality of initial packets of a media communications session from a first next-hop router; and, in response to receiving the initial packets from the first next-hop router, transmitting outgoing packets for the media communications session to the first next-hop router for transmission to the network.

7. The method of claim 6 comprising extracting a source media access control (MAC) address from one of the initial packets and addressing the outgoing packets to the MAC address extracted from the initial packet associated with the same VoIP session.

8. The method of claim 1 comprising:
   (a) receiving, at the media gateway, a plurality of first packets associated with a first media communications session, the initial packets arriving at the media gateway through a first next-hop router;
   (b) receiving, at the media gateway, a plurality of second packets associated with the first media communications session, the second packets arriving at the media gateway through a second next-hop router; and
   (c) at the media gateway, forwarding outgoing packets associated with the first media communications session to the network through the second next-hop router.

9. The method of claim 8 wherein forwarding outgoing packets associated with the first media communications session to the second next-hop router includes waiting for a predetermined time period before forwarding the outgoing packets through the second next-hop router.

10. The method of claim 1 comprising originating a media communications session from the media gateway and selecting an initial next-hop router for the session based on configuration information in the media gateway.

11. The method of claim 10 comprising selecting a new next-hop router for the session based on a next-hop router through which incoming packets are received for the session.

12. The method of claim 10 comprising, in response to failing to receive incoming packets for the session, selecting a different initial next-hop router for the session.

13. The method of claim 10 wherein selecting an initial next-hop router for the session includes selecting a next-hop router based on load balancing criteria.

14. The method of claim 1 comprising establishing a plurality of paths between the media gateway and a remote media gateway, wherein establishing a plurality of paths includes establishing a plurality of paths over at least one of an Internet protocol (IP) network, a multiprotocol label switching (MPLS) network, and asynchronous transfer mode (ATM) network, and a frame relay network.

15. The method of claim 1 wherein the plurality of voice servers comprises first and second sets of voice over IP hosts, wherein the plurality of next-hop routers comprises first and second sets of next-hop routers, wherein the first set of voice over IP hosts are connected to the first set of next-hop routers, wherein the second set of voice over IP hosts are connected to the second set of next-hop routers, and wherein the first and second sets of next-hop routers are associated with first and second domains, respectively.

16. A method for providing a media gateway having multi-appearing voice servers, the method comprising:
   (a) providing a plurality of voice servers within a media gateway, each voice server including media processing resources for processing media streams associated with media sessions between media gateways, wherein the media gateway controls each of the voice servers, and the media gateway is controlled by a media gateway controller, wherein the media gateway controller communicates call control information to the media gateway via a media gateway control protocol;
   (b) providing a plurality of network interfaces within the media gateway, wherein at least one of the voice servers is reachable through at least two of the interfaces;
   (c) providing a plurality of next-hop routers external to the media gateway for connecting the interfaces and the voice servers to a network; and
   (d) assigning costs to associations between each next-hop router and each voice server reachable via the next-hop routers,
   wherein assigning costs to associations between the next-hop routers and voice servers reachable via the next-hop routers includes assigning costs that are at least one order of magnitude greater than network route costs to remote voice servers.

17. A method for providing a media gateway having multi-appearing media processing hosts, the method comprising:
   (a) providing a plurality of media processing hosts in a media gateway, each media processing host including media processing resources for processing media streams associated with media sessions between media gateways;
   (b) providing a plurality of network interfaces in the media gateway, wherein at least one of the media processing hosts is reachable through at least two of the interfaces;
   (c) providing a plurality of next-hop routers for connecting the interfaces and the media processing hosts to a network;
   (d) receiving, at the media gateway, a plurality of first packets associated with a first media communications session, the initial packets arriving at the media gateway through a first next-hop router;
   (e) receiving, at the media gateway, a plurality of second packets associated with the first media communications session, the second packets arriving at the media gateway through a second next-hop router; and
   (f) at the media gateway, forwarding outgoing packets associated with the first media communications session to the network through the second next-hop router,
   wherein forwarding outgoing packets associated with the first media communications session to the second next-hop router includes waiting for a predetermined time period before forwarding the outgoing packets through the second next-hop router, and
   wherein the media gateway comprises a called media gateway and wherein the predetermined time period is set shorter than a time period in a calling media gateway.

18. A method for providing a media gateway having multi-appearing media processing hosts, the method comprising:
   (a) providing a plurality of media processing hosts in a media gateway, each media processing host including media processing resources for processing media streams associated with media sessions between media gateways;
   (b) providing a plurality of network interfaces in the media gateway, wherein at least one of the media processing hosts is reachable through at least two of the interfaces;
   (c) providing a plurality of next-hop routers for connecting the interfaces and the media processing hosts to a network;
   (d) receiving, at the media gateway, a plurality of first packets associated with a first media communications session, the initial packets arriving at the media gateway through a first next-hop router;
   (e) receiving, at the media gateway, a plurality of second packets associated with the first media communications session, the second packets arriving at the media gateway through a second next-hop router; and
   (f) at the media gateway, forwarding outgoing packets associated with the first media communications session to the network through the second next-hop router,
   wherein forwarding outgoing packets associated with the first media communications session to the second next-hop router includes waiting for a predetermined time period before forwarding the outgoing packets through the second next-hop router, and
   wherein the media gateway comprises a calling media gateway and wherein the predetermined time period is set shorter than a time period in a called media gateway.

19. A system with multi-appearing voice servers, the system comprising:
   (a) a media gateway comprising:
      (i) a plurality of voice servers within the media gateway, the voice servers each containing media processing resources for processing media streams associated with media communication sessions between media gateways, wherein the media processing resources on each voice server include at least one of: a codec; voice over IP, ATM, and TDM chips; and digital signal processing resources, wherein the media gateway controls each of the voice servers, and the media gateway is controlled by a media gateway controller, wherein the media gateway controller communicates call control information to the media gateway via a media gateway control protocol; and
      (ii) a plurality of network interfaces within the media gateway, wherein at least one of the voice servers is reachable via at least two of the network interfaces; and
   (b) a plurality of next-hop routers external to the media gateway, wherein the next-hop routers advertise reachability information to voice servers reachable by the next-hop routers and wherein the next-hop routers receive routing information and dynamically generate and maintain routing tables associated with media communication paths.

20. The system of claim 19 comprising a plurality of links for connecting the voice servers to the next-hop routers and a cost matrix including costs associated with each of the links.

21. The system of claim 20 wherein at least one of the costs in the cost matrix is substantially equal to a network route cost to a remote voice server.

22. The system of claim 20 wherein at least one of the costs in the cost matrix is at least one order of magnitude greater than a network route cost to a remote voice server.

23. The system of claim 20 wherein at least one of the costs in the cost matrix is at least one order of magnitude of less than a network route cost to a remote voice server.

24. The system of claim 19 wherein the media gateway continuously monitors next-hop routers over which packets associated with a session are received.

25. The system of claim 24 wherein the media gateway switches outgoing packets associated with a session from a first next-hop router to a second next-hop router in response to receiving packets associated with the session from the second next-hop router.

26. The system of claim 25 wherein the media gateway switches the packets to the second next-hop router after a predetermined time period.

27. The system of claim 19 wherein the next-hop routers maintain multiple paths with a remote media gateway and dynamically update the paths so that media communications traffic can be rerouted in response to network failures.

28. A system with multi-appearing media processing hosts, the system comprising:
  (a) a media gateway comprising:
    (i) a plurality of media processing hosts containing media processing resources for processing media streams associated with media communication sessions between media gateways; and
    (ii) a plurality of network interfaces, wherein at least one of the media processing hosts is reachable via at least two of the network interfaces; and
  (b) a plurality of next-hop routers, wherein the next-hop routers advertise reachability information to media processing hosts reachable by the next-hop routers and wherein the next-hop routers receive routing information and dynamically generate and maintain routing tables associated with media communication paths,
  wherein the media gateway continuously monitors next-hop routers over which packets associated with a session are received,
  wherein the media gateway switches outgoing packets associated with a session from a first next-hop router to a second next-hop router in response to receiving packets associated with the session from the second next-hop router,
  wherein the media gateway switches the packets to the second next-hop router after a predetermined time period, and
  wherein the predetermined time period is set to a value that is different from a corresponding time period set by a remote media gateway.

29. A computer program product comprising computer-executable instructions embodied in a non-transitory computer-readable medium for performing steps comprising:
  (a) at a voice server within a media gateway, receiving packets associated with a first media communications session from a first next-hop router external to the media gateway through a first network interface within the media gateway, wherein the media gateway controls each of the voice servers, and the media gateway is controlled by a media gateway controller, wherein the media gateway controller communicates call control information to the media gateway via a media gateway control protocol;
  (b) at the voice server, receiving packets associated with the first media communications session from a second next-hop router external to the media gateway through a second network interface within the media gateway; and
  (c) in response to receiving the packets from the second next-hop router, forwarding, from the voice server within the media gateway, outbound packets associated with the first media communications session to the second next-hop router through the second network interface.

30. The computer program product of claim 29 wherein receiving packets associated with a first media communications session includes receiving packets associated with a voice over IP communications session.

31. The computer program product of claim 29 wherein receiving packets associated with a first media communications session includes receiving packets associated with a voice over asynchronous transfer mode (ATM) session.

32. The computer program product of claim 29 wherein receiving packets associated with a first media communication session includes receiving packets associated with a voice over frame relay session.

33. The computer program product of claim 29 wherein receiving packets associated with a first media communication session includes receiving packets associated with a voice over multiprotocol label switching (MPLS) session.

34. The computer program product of claim 29 wherein forwarding the outbound packets associated with the first media communications session to the second next-hop router includes waiting a predetermined time period before forwarding the outbound packets to the second next-hop router.

35. A computer program product comprising computer-executable instructions embodied in a non-transitory computer-readable medium for performing steps comprising:
  (a) receiving packets associated with a first media communications session from a first next-hop router at a media gateway;
  (b) receiving packets associated with the first media communications session from a second next-hop router at the media gateway; and
  (c) in response to receiving the packets from the second next-hop router, forwarding, from the media gateway, outbound packets associated with the session to the second next-hop router, wherein forwarding the second packet associated with the media communications session to the second next-hop router includes waiting a predetermined time period before forwarding the second packet to the second next-hop router, wherein the predetermined time period is set to be different from a hold out timer maintained by a remote media gateway associated with the media communications session.

* * * * *